United States Patent Office 3,264,374
Patented August 2, 1966

3,264,374
GRAFT COPOLYMER FORMED BY POLYMERIZING BUTADIENE IN STYRENE WITH AN ALKYL-Li CATALYST, DEACTIVATING THE CATALYST AND ADDING AN ORGANIC PEROXIDE
Robert W. Jones, Wilbraham, Mass., assignor to Monsanto Company, a corporation of Delaware
No Drawing. Filed Jan. 2, 1963, Ser. No. 248,891
19 Claims. (Cl. 260—880)

This invention relates to rubber-modified styrene-type polymers and more particularly relates to novel processes for preparing such materials and for producing diene rubbers to be employed in preparing such materials.

It is know to prepare styrene-type polymers having improved impact strength by preparing a diene rubber, dissolving the diene rubber in a styrene-type monomer or in a monomer mixture including a styrene-type monomer, and subsequently polymerizing the monomer or monomers. Known processes for preparing rubber-modified styrene-type polymers by this technique have certain disadvantages, e.g., (1) in order for the diene rubber to be obtained in a form suitable for its being dissolved in a styrene-type monomer, a costly separation step must be included in conventional diene rubber syntheses, i.e., the diene rubber must be coagulated, washed, and dried if prepared by an emulsion technique, must be separated from a reaction medium if prepared by conventional solution techniques, or must be separated from excess monomer if prepared as a solution in its own monomer, (2) shipping, storage, and handling costs for solids are usually higher than for liquids, (3) many diene rubbers are not readily dissolved in styrene-type monomers, (4) many rubber polymerization processes result in the formation of a diene rubber having an undesirably high content of 1,2- or 3,4-addition products, and (5) at least some diene rubbers become less suitable for use in preparing rubber-modified styrene-type polymers when they are stored for a time prior to use.

An object of the invention is to provide novel rubber-modified styrene-type polymers.

Another object is to provide a novel process for preparing rubber-modified styrene-type polymers.

Another object is to provide a convenient, economical process for preparing rubber-modified styrene-type polymers.

A further object is to provide a novel process for preparing diene rubbers to be employed in producing rubber-modified styrene-type polymers.

These and other objects are attained by (1) preparing a rubber-in-monomer solution by contacting a conjugated 1,3-diene hydrocarbon with a catalytic amount of lithium or a hydrocarbyl lithium, maintaining it in contact with the lithium catalyst in the presence, as the sole diluent, of a total of at least 3 parts by weight of a monovinylident aromatic hydrocarbon/part of the conjugated 1,3-diene hydrocarbon—the diluent being incorporated initially and/or during the polymerization of the conjugated 1,3-diene hydrocarbon—until a rubbery polymer containing not more than 75% by weight of chemically-combined monovinylident aromatic hydrocarbon is obtained, and then deactivating the rubbery polymer and (2) heating the rubber-in-monomer solution, optionally in intimate admixture with one or more copolymerizable materials, to polymerize the monovinylidene aromatic hydrocarbon and any other copolymerizable materials which have been incorporated.

The following examples are given to illustrate the invention and are not intended as a limitation thereof. The substantial absence of anionic catalyst poisons, such as air, oxygen, carbon dioxide, and Lewis acids, in the diene rubber syntheses described in the examples is insured by the techniques conventionally employed in anionic polymerization processes, i.e., pre-purification of the materials to be employed in the reaction, choice of a suitable reaction vessel, and maintenance of an inert atmosphere throughout the reaction. Unless otherwise specified, quantities mentioned are quantities by weight.

EXAMPLE I

Part A

Charge 10 parts of butadiene, 90 parts of styrene, and about 0.02 part of a 15% solution of n-butyl lithium in hexane to a suitable reaction vessel. Heat the reaction mixture at 40° C. until the butadiene is substantially completely converted to polymer. Then add about 0.006 part of butanol to deactivate the polymer. The product is a solution in styrene of a rubbery polymer containing a minor amount of chemically-combined styrene and consisting of a large block of polybutadiene containing a few styrene units and a small block of polystyrene. The polybutadiene block consists principally of 1,4-butadiene units.

Part B

Dissolve 0.05 part of di-t-butyl peroxide, 0.3 part of an antioxidant, and 0.1 part of a commercial dodecyl mercaptan modifier in the rubber-in-styrene solution of Part A. Purge the reaction vessel with nitrogen, and heat the reaction mixture at 110° C. with agitation until its solution viscosity stops increasing continuously with increased polymer formation, suddenly decreases, and then begins to increase again, indicating that phase inversion of the polymeric portion of the reaction mixture from a dispersion of polystyrene in rubber to a dispersion of rubber in polystyrene has occurred. Then transfer the reaction mixture to a reaction vessel containing (a) 100 parts of water, (b) 0.05 part of calcium chloride, (c) 0.13 part of an acrylic acid/2-ethylhexyl acrylate copolymer having a combined 2-ethylhexyl acrylate content of 4.5 mol percent and a specific viscosity of about 4.0 (as determined in a 1% aqueous solution at 25° C.) and (d) 0.2 part of the sodium salt of bis(sulfonaphthyl) methane. Pressurize the reaction mixture with nitrogen, and heat with agitation at 130° C. for 3 hours and 140° C. for 5 hours. The process results in substantially complete conversion of styrene to polymer, some of which is grafted onto the rubbery polymer. The product is a rubber-modified polystyrene having a higher impact strength than polystyrene.

Similar results are observed when Example I is repeated except that (1) about 0.0008 part of a 35% dispersion of finely-divided lithium in petrolatum, (2) about 0.06 part of a 10% solution of 2-ethylhexyl lithium in hexane, (3) about 0.01 part of a a 15% solution of ethyl lithium in heptane, (4) about 0.04 part of a 10% solution of benzyl lithium in benzene, or (5) about 0.006 part of a 15% solution of ethylene dilithium in hexane is substituted for the 0.02 part of a 15% solution of n-butyl lithium in hexane.

EXAMPLE II

Repeat Example I except for substituting 90 parts of a 2:1 mixture of styrene and alpha-methylstyrene for the 90 parts of styrene. Similar results are observed except that the product has a higher heat distortion temperature than the rubber-modified polystyrene of Example I.

EXAMPLE III

Repeat Example I except for (1) heating the butadiene/styrene/n-butyl lithium reaction mixture at 40° C. only until the stage of about 90% conversion of butadiene to polymer and (2) after deactivating the rubbery polymer, removing the unreacted butadiene by fractional distillation under vacuum. Similar results are observed except that the rubbery polymer has a smaller styrene content than the rubbery polymer of Example I.

EXAMPLE IV

Repeat Example I except for employing only 0.5 part of styrene in the initial reaction vessel charge and adding 20 parts of styrene at the stage of about 10% conversion of butadiene to polymer, 20 parts of styrene at the stage of about 25% conversion, and the remainder of the 90 parts of styrene at the stage of about 50% conversion. Similar results are observed except that the polybutadiene block of the rubbery polymer contains fewer styrene units than the polybutadiene block of the rubbery polymer of Example I.

EXAMPLE V

Repeat Example I except for employing no styrene in the initial reaction mixture and continuously adding the 90 parts of styrene between the stages of 20% and 100% conversion of butadiene to polymer at a rate such that the polymer content of the reaction mixture is not allowed to exceed 25%. Similar results are observed except that the polybutadiene block of the rubbery polymer contains fewer styrene units than the polybutadiene block of the rubbery polymer of Example I.

EXAMPLE VI

Part A

Charge 10 parts of butdiene, about 0.04 part of a 15% solution of n-butyl lithium in hexane, and 3 parts of a white mineral oil to a suitable reaction vessel. Heat the reaction mixture at 50° C. until about 15% of the butadiene has been converted to polymer. Add 20 parts of alpha-methylstyrene to the reaction mixture and continue heating at 50° C. until about 50% of the butadiene has been converted to polymer. Add an additional 20 parts of alpha-methylstyrene to the reaction mixture and continue heating at 50° C. until the butadiene is substantially completely converted to polymer. Then add about 0.02 part of butanol to deactivate the polymer. The product is a solution in alpha-methylstyrene of a rubbery polymer containing a minor amount of chemically-combined alpha-methylstyrene and consisting of a large block of polybutadiene containing a few alpha-methylstyrene units and a small block of polymerized alpha-methylstyrene. The polybutadiene block consists principally of 1,4-butadiene units.

Part B

Add 50 parts of styrene, 0.05 part of di-t-butyl peroxide, 0.3 part of antioxidant, and 0.1 part of a commercial dodecyl mercaptan modifier with agitation to the rubber-in-monomer solution of Part A. Purge the reaction vessel with nitrogen, and heat the reaction mixture with agitation at 100° C. until the stage of about 85% conversion of the styrene and alpha-methylstyrene monomers to polymer. Terminate the polymerization and devolatilize the product. The product is a rubber-modified styrene/alpha-methylstyrene copolymer having some of the styrene/alpha-methylstyrene copolymer grafted onto the rubbery polymer.

EXAMPLE VII

Part A

Charge 5 parts of butadiene and about 0.004 part of a 15% solution of n-butyl lithium in hexane to a suitable reaction vessel. Heat the reaction mixture at 60° C., adding 10 parts of styrene at the stage of about 10% conversion of butadiene to polymer, 15 parts of styrene at the stage of about 25% conversion, and 30 parts of styrene at the stage of about 50% conversion, and continue heating until the butadiene is substantially completely converted to polymer. Then add about 0.002 part of butanol to deactivate the polymer. The product is a solution in styrene of a rubbery polymer containing a minor amount of chemically-combined styrene and consisting of a large block of polybutadiene containing a few styrene units and a small block of polystyrene. The polybutadiene block consists principally of 1,4-butadiene units.

Part B

Intimately mix 5 parts of a commercial linear polybutadiene rubber with the rubber-in-monomer solution of Part A. Then add 20 parts of styrene, 15 parts of acrylonitrile, 0.05 part of di-t-butyl peroxide, 0.3 part of an antioxidant, and 0.1 part of a commercial dodecyl mercaptan modifier with agitation. Purge the reaction vessel with nitrogen and heat the reaction mixture at 110° C. until phase inversion has occurred. Transfer the reaction mixture to a reaction vessel containing (a) 100 parts of water, (b) 0.05 part of calcium chloride, (c) 0.13 part of an acrylic acid/2-ethylhexyl acrylate copolymer having a combined 2-ethylhexyl acrylate content of 4.5 mol percent and a specific viscosity of about 4.0 (as determined in a 1% aqueous solution at 25° C.) and (d) 0.2 part of the sodium salt of bis(sulfonaphthyl) methane. Pressurize the reaction mixture with nitrogen, and heat with agitation at 130° C. for 3 hours and 140° C. for 5 hours. The process results in substantially complete conversion of styrene and acrylonitrile to a copolymer, some of which is grafted onto the rubbery polymers. The product is a rubber-modified styrene-acrylonitrile copolymer having a higher impact strength than a styrene-acrylonitrile copolymer.

Similar results are observed when Example VII is repeated except for substituting 5 parts of isoprene for the 5 parts of butadiene in the initial reaction vessel charge. The polyisoprene block of the rubbery polymer, like the polybutadiene block of the rubbery polymer of Example VII, consists principally of 1,4-diene units.

EXAMPLE VIII

Repeat Example VII except for continuing to heat the butadiene/styrene/n-butyl lithium reaction mixture after the stage of substantially complete conversion of butadiene to polymer and delaying addition of the deactivating agent until the rubbery polymer has a styrene content of about 70%. Similar results are observed except that the rubbery polymer contains a larger block of polystyrene than the rubbery polymer of Example VII.

In accordance with the present invention, a rubber-in-monomer solution suitable for the preparation of rubber-modified styrene-type polymers is conveniently produced by contacting a conjugated 1,3-diene hydrocarbon with a catalytic amount of lithium or a hydrocarbyl lithium, maintaining it in contact with the lithium catalyst in the presence, as the sole diluent, of a total of at least 3 parts by weight of a monovinylidene aromatic hydrocarbon/part of the conjugated 1,3-diene hydrocarbon until a rubbery polymer containing not more than 75% by weight of chemically-combined monovinylidene aromatic hydrocarbon is obtained, and then deactivating the rubbery polymer. A rubber-modified styrene-type polymer is prepared by heating this rubber-in-monomer solution, optionally in intimate admixture with one or more copolymerizable materials, to polymerize the monovinylidene aromatic hydrocarbon and any other copolymerizable materials which have been incorporated.

The conjugated 1,3-diene hydrocarbon employed in the practice of the invention is preferably butadiene, although other such diene hydrocarbons, e.g., isoprene, piperylene, etc., are also utilizable. Mixtures of conjugated 1,3-diene hydrocarbons can be employed if desired.

Monovinylidene aromatic hydrocarbons utilizable as diluents for the lithium-catalyzed polymerization of the conjugated 1,3-diene hydrocarbon include, e.g., styrene; ar-alkyl-styrenes, such as o-, m-, and p-methylstyrenes, ar-ethylstyrenes, p-butylstyrene, 2,4-dimethylstyrene, etc.; alpha-alkylstyrenes, such as alpha-methylstyrene, alphaethylstyrene, alpha-methyl-p-methylstyrene, etc., and mixtures thereof. Preferred diluents are styrene, styrene/alpha-methylstyrene mixtures, and—when a copolymerizable monovinyl aromatic monomer is to be added after preparation and deactivation of the rubbery polymer—alpha-methylstyrene. When a rubber-modified styrene-type polymer having good impact strength is desired, a non-vinyl monovinylidene aromatic hydrocarbon is not employed as the sole diluent or employed in concentrations higher than about 60 mol percent of the total diluent unless a copolymerizable monovinyl aromatic monomer is to be added after preparation and deactivation of the rubbery polymer, since these non-vinyl monomers do not polymerize to sufficiently high molecular weight materials to permit good impact strength to be attained.

As noted above, the monovinylidene aromatic hydrocarbon diluent is employed in such amounts as to total at least 3 parts by weight/part of conjugated 1,3-diene hydrocarbon being polymerized. Since, as demonstrated in Example VII, a supplemental rubber can be intimately mixed with the rubber-in-monomer solution after deactivation of the rubbery polymer of the invention, there naturally is no upper limitation on the total amount of monovinylidene aromatic hydrocarbon which can be employed as a diluent. When no copolymerizable material, i.e., no supplemental rubbery polymer, additional monovinylidene aromatic hydrocarbon, or other copolymerizable material, is to be added to the rubber-in-monomer solution after the deactivation step, the total amount of monovinylidene aromatic hydrocarbon employed as a diluent is usually in the range of about 3–100 parts, preferably about 5–25 parts/part of conjugated 1,3-diene hydrocarbon in order for the final rubber-modified styrene-type polymer product to have a polymerized conjugated 1,3-diene content of about 1–25%, preferably about 4–15%.

The lithium catalyst can be lithium or a hydrocarbyl lithium, preferably an alkyl, alkenyl, aryl, cycloalkyl, aralkyl, alkaryl, alkylcycloalkyl, or cycloalkylalkyl lithium wherein the hydrocarbyl radical contains 1–10 carbon atoms. The alkyl lithiums are especially preferred. Exemplary of utilizable hydrocarbyl lithiums are the methyl, ethyl, isopropyl, butyl, pentyl, hexyl, 2-ethylhexyl, allyl, methallyl, phenyl, benzyl, tolyl, 4-butylphenyl, 4-phenylbutyl, cyclohexyl, 4-butylcyclohexyl, and 4-cyclohexylbutyl lithiums, and the like, hydrocarbyl polylithiums, such as ethylene dilithium, pentamethylene dilithium, decamethylene dilithium, 1,3,5-trilithium propane, etc. The lithium or hydrocarbyl lithium, of course, is employed in a catalytic amount, the exact amount depending on the molecular weight desired for the rubbery polymer: higher catalyst concentrations lead to the formation of lower molecular weight rubbers. Ordinarily, from $1 \times 10^{-6}$ to $3 \times 10^{-5}$ mol of lithium catalyst is employed/gram of conjugated 1,3-diene hydrocarbon. Intimate contact between the catalyst and the conjugated 1,3-diene hydrocarbon is facilitated by employing the lithium catalyst in the form of a fine dispersion or solution in a suitable non-polar medium, such as an alkane, aromatic hydrocarbon, petrolatum, etc. Any medium in which the lithium catalyst is dispersed or dissolved must be non-polar, because the presence of polar materials during the polymerization of the conjugated 1,3-diene hydrocarbon favors a 1,2- or 3,4-addition of the diene units.

Polymerization of the conjugated 1,3-diene hydrocarbon in contact with the lithium catalyst and in the presence of a monovinylidene aromatic hydrocarbon diluent is usually accomplished at 0–100° C., preferably at about 40–70° C. Autogenous or applied pressure can be used to maintain the conjugated diene in the liquid phase. If desired, minor amounts (e.g., up to about 5% of the weight of the total reaction mixture) of non-polar materials, such as white mineral oil lubricants, can be present during the polymerization, but polar materials, such as ester lubricants, cannot be employed, since their presence would favor a 1,2- or 3,4-addition of the diene units. As is customary in anionic polymerization processes, anionic catalyst poisons, such as air, oxygen, carbon dioxide, and Lewis acids, should be substantially completely excluded. Compensation can be made for the presence of catalyst poisons by using a sufficient excess of lithium catalyst, but this is less economical than taking precautions to insure the substantial absence of the catalyst poisons.

During the polymerization of the conjugated diene, only small amounts of the monovinylidene aromatic hydrocarbon diluent become incorporated into the polymer until most of the conjugated diene has polymerized. Larger amounts of the diluent then enter into the reaction, and finally—unless the reaction is terminated prior to complete conversion of the conjugated diene to polymer—the diluent begins to block copolymerize with the previously-formed block of diene polymer containing a few units of monovinylidene aromatic hydrocarbon. Since, in the polymers having a high monovinylidene aromatic hydrocarbon content, most of the polymerized monovinylidene aromatic hydrocarbon is present as a block, the rubbery polymers of the invention can tolerate higher monovinylidene aromatic hydrocarbon cotnents than conventional conjugated diene/monovinylidene aromatic hydrocarbon copolymers without losing their rubbery characteristics. If desired, polymerization can be allowed to continue until the rubbery polymer contains up to 75% by weight of chemically-combined monovinylidene aromatic hydrocarbon.

Because of the nature of the reaction, it is possible to regulate both the total monovinylidene aromatic hydrocarbon content of the rubbery polymer and the content of monovinylidene aromatic hydrocarbon in the polydiene block of the rubbery polymer. Thus, the total monovinylidene aromatic hydrocarbon content can be maximized by allowing polymerization to continue until all of the conjugated diene has polymerized and sufficient monovinylidene aromatic hydrocarbon has block copolymerized with the polydiene block for the rubbery polymer to contain about 75% by weight of chemically-combined monovinylidene aromatic hydrocarbon and can be minimized by terminating the polymerization as soon as sufficient conjugated diene has polymerized for a rubbery polymer to be obtained. The content of monovinylidene aromatic hydrocarbon in the polydiene block of the rubbery polymer can be maximized by maintaining a high monovinylidene aromatic hydrocarbon/conjugated diene monomer ratio in the reaction mixture throughout the polymerization of the conjugated diene in order to maximize the rate at which the diluent enters into the reaction and can be minimized by maintaining as low a monovinylidene aromatic hydrocarbon/conjugated diene monomer ratio as possible throughout the polymerization of the conjugated diene.

Ordinarily, when a rubbery polymer having a minimum monovinylidene aromatic hydrocarbon content in the polydiene block is desired, no diluent or only a small amount of diluent, e.g., up to about 0.1 part by weight of monovinylidene aromatic hydrocarbon/part of conjugated diene, is included in the reaction mixture until polymerization of the conjugated diene has proceeded to the stage where the reaction mixture becomes too viscous for easy handling (usually at about 5–20% conversion of conjugated diene to polymer), and a monovinylidene aromatic hydrocarbon is then added in an amount at least sufficient to permit easy handling of the reaction mixture. The total amount of monovinylidene aromatic hydrocarbon to be employed as a diluent may be added at this time, but it is usually preferred to add only sufficient monovinyldene aromatic hydrocarbon to permit easy handling of the reaction mixture and then add the remainder of the diluent in one or more charges later in the reaction when the reaction mixture has again become too viscous for easy handling or to add the monovinylidene aromatic hydrocarbon continuously at a rate such that the polymer content of the reaction mixture is maintained below the level at which the reaction mixture becomes too viscous for easy handling.

Termination of the lithium-catalyzed polymerization of the invention is accomplished in the conventional manner, i.e., deactivating the rubbery polymer by adding to the reaction mixture at least one equivalent, usually about 2–5 equivalents, of an anionic catalyst poison/equivalent of lithium catalyst employed. Any of the known anionic catalyst poisons can be employed as deactivators in the practice of the invention, the preferred deactivators being water and alcohols such as methanol, ethanol, butanol, etc. It is preferred to employ the deactivator in amounts not substantially in excess of the amount required to deactivate the rubbery polymer in order to avoid precipitating the polymer, although the precipitated rubbery polymer can be redissolved in the monovinylidene aromatic hydrocarbon after removal of the deactivator when precipitating amounts of deactivator are employed. When the polymerization is terminated prior to complete conversion of the conjugated 1,3-diene hydrocarbon to polymer, the unreacted diene can be easily removed by fractional distillation under vacuum or, if desired, can be left in the reaction mixture.

The deactivated rubber-in-monomer solutions can be used in preparing rubber-modified styrene-type polymers either substantially immediately after the deactivation step or after being stored for awhile, since the solutions can be stored as easily as styrene-type monomers without making them less suitable for use in this application. As will be readily understood, a polymerization inhibitor should be incorporated to prevent premature polymerization of the monovinylidene aromatic hydrocarbon when the rubber-in-monomer solutions are to be stored prior to use, and stabilizers such as antioxidants can also be incorporated if desired.

In accordance with the present invention, a rubber-modified styrene-type polymer is prepared by heating a polymerizable material comprising a rubber-in-monomer solution of the invention in order to polymerize the monovinylidene aromatic hydrocarbon. In addition to the rubber-in-monomer solution, the polymerizable material can comprise one or more copolymerizable materials, such as an unreacted diene remaining in the solution after termination of the lithium-catalyzed polymerization or ingredients intimately mixed with the rubber-in-monomer solution after the deactivation step, e.g., an additional rubbery conjugated 1,3-diene polymer, such as natural rubber, polybutadiene, polyisoprene, copolymers of butadiene and/or isoprene with one or more comonomers such as styrene, alpha-methylstyrene, (meth)acrylic acid, (meth)acrylonitrile, methyl (meth)acrylate, higher alkyl (meth)acrylates, etc., preferably a substantially linear diene rubber consisting principally of 1,4-diene units; one or more additional monovinylidene aromatic hydrocarbons; an ar-halo monovinylidene aromatic hydrocarbon, such as the o-, m-, and p-chlorostyrenes, p-bromostyrene, 2,4-dichlorostyrene, 2-chloro-4-methylstyrene, etc.; a conjugated 1,3-diene, such as butadiene, isoprene, etc.; an acrylic compound, such as (meth)acrylic acid, (meth)acrylonitrile, (meth)acrylamide, methyl(meth)acrylate, 2-ethylhexyl (meth)acrylate, and other alkyl (meth)acrylates, etc. Ordinarily, the components of the polymerizable material are combined in such proportions that the polymerizable material has a polymerized conjugated 1,3-diene content of about 1–25%, preferably about 4–15% by weight, and a monovinylidene aromatic hydrocarbon constitutes at least about 50% by weight of the monomeric ingredients.

Preparation of a rubber-modified styrene-type polymer in accordance with the present invention can be accomplished by any of the techniques conventionally employed in preparing such materials by polymerizing a styrene-type monomer, containing a dissolved rubber, with the exception that a rubber-in-monomer solution of the invention is an essential ingredient of the polymerizable material and is preferably the only ingredient comprising a polymerized conjugated 1,3-diene. Thus, the polymerization can be conducted by mass, suspension, or mass-suspension techniques, usually with agitation at temperatures in the range of about 50–175° C., until the desired conversion of monomer to polymer is obtained. When desired, materials such as free radical polymerization initiators, stabilizers, plasticizers, polymerization modifiers, colorants, etc., are included in the reaction mixture polymerization modifiers being particularly desirable in the all-mass processes because of the heat-transfer problems associated with mass polymerization.

When a suspension technique is employed, water, a suspending agent, and any other adjuvants desired for the suspension process are also included in the reaction mixture. Preferred suspending agents are water-soluble acrylic acid/alkyl (meth)acrylate copolymers of the type described in U.S. Patent 3,051,682, a particularly suitable suspending agent being a water-soluble copolymer of 95–98 mol percent of acrylic acid and 5–2 mol percent of 2-ethylhexyl acrylate.

When a mass-suspension technique is employed, polymerization is usually conducted by a mass process until phase inversion has occurred (i.e., until sufficient resinous polymer has been formed for the adjustment in the relative amounts of resinous and rubbery polymer to force the diene rubber to become the discontinuous rather than the continuous phase of the resinous polymer-diene rubber dispersion, resulting in an abrupt decrease in the viscosity of the reaction mixture), and the adjuvants for the suspension process are usually incorporated within about 5–10% additional conversion of monomer to polymer after phase inversion has occurred.

After the polymerizable material has been heated to obtain the desired degree of polymerization, any unreacted monomer can be removed by conventional devolatilization techniques. The product can be used per se or can be diluted to a lower rubber content by blending it with a resinous styrene-type polymer.

The invention is particularly advantageous in that it provides convenient, economical processes for preparing rubber-modified styrene-type polymers and rubber-in-monomer solutions for use in preparing rubber-modified styrene-type polymers and has the additional advantage that the rubber-in-monomer solutions can be easily stored without causing deterioration of the rubbery polymers. The rubbery polymers obtained by the practice of the invention have the desirable characteristic of having their combined diene content composed principally of 1,4-diene units.

It is obvious that many variations can be made in the products and processes set forth above without departing from the spirit and scope of this invention.

What is claimed is:

1. A process which comprises the steps of contacting a conjugated 1,3-diene hydrocarbon with a lithium catalyst of the group consisting of lithium and a hydrocarbyl lithium, maintaining it in contact with the lithium catalyst in the presence, as the sole diluent, of a total of at least 3 parts by weight of a monovinylidene aromatic hydrocarbon/part of the conjugated 1,3-diene hydrocarbon until a rubbery polymer containing not more than about 75% by weight of chemically-combined monovinylidene aromatic hydrocarbon is obtained, deactivating the rubbery polymer to terminate the activity of the lithium catalyst to produce a polymerizable material comprising a rubber in monomer solution; adding an organoperoxy catalyst to said polymerizable material and heating said polymerizable material in the presence of said organoperoxy catalyst to produce polymerization thereof and grafting of at least a portion of said monovinylidene aromatic hydrocarbon onto said rubbery polymer.

2. The process of claim 1 wherein the polymerizable material is mass polymerized until phase inversion of the reaction mixture has occurred and is subsequently polymerized in aqueous suspension.

3. The process of claim 1 wherein the polymerizable material has a polymerized conjugated 1,3-diene content of about 4–15% by weight.

4. The process of claim 1 wherein the polymerizable material comprises a mixture of the rubber-in-monomer solution and a copolymerizable monomer.

5. The process of claim 4 wherein the copolymerizable monomer is a monovinylidene aromatic hydrocarbon.

6. The process of claim 4 wherein the copolymerizable monomer is an acrylic compound.

7. The process of claim 1 wherein the polymerizable material comprises an intimate mixture of the rubber-in-monomer solution and an additional rubbery conjugated 1,3-diene polymer.

8. The process of claim 1 wherein the conjugated 1,3-diene hydrocarbon employed in preparing the rubber-in-monomer solution is butadiene.

9. The process of claim 1 wherein the monovinylidene aromatic hydrocarbon employed in preparing the rubber-in-monomer solution is styrene.

10. The process of claim 1 wherein the monovinylidene aromatic hydrocarbon employed in preparing the rubber-in-monomer solution is a mixture of styrene and alpha-methylstyrene.

11. The process of claim 1 wherein the lithium catalyst employed in preparing the rubber-in-monomer solution is a hydrocarbyl lithium.

12. The process of claim 11 wherein the hydrocarbyl lithium is an alkyl lithium.

13. The product obtained by the process of claim 1.

14. A process which comprises contacting a conjugated 1,3-diene hydrocarbon with a lithium catalyst of the group consisting of lithium and a hydrocarbyl lithium, maintaining it in contact with the lithium catalyst in the presence, as the sole diluent, of a total of at least 3 parts by weight of a monovinylidene aromatic hydrocarbon/part of the conjugated 1,3-diene hydrocarbon until a rubbery polymer containing not more than about 75% by weight of chemically-combined monovinylidene aromatic hydrocarbon is obtained, deactivating the rubbery polymer to terminate the activity of the lithium catalyst, adding an organoperoxy catalyst, and heating the resultant rubber-in-monomer solution to polymerize the monovinylidene aromatic hydrocarbon and grafting at least a portion thereof upon said rubbery polymer.

15. A process which comprises contacting butadiene with an alkyl lithium catalyst, maintaining it in contact with the alkyl lithium in the presence, as the sole diluent, of a total at least 3 parts by weight of styrene/part of butadiene until a rubbery polymer containing not more than about 75% by weight of chemically-combined styrene is obtained, deactivating the rubbery polymer to terminate the activity of the lithium catalyst, adding an organoperoxy catalyst, and heating the resultant rubber-in-styrene solution to polymerize the styrene and grafting at least a portion thereof upon said rubbery polymer.

16. A process which comprises polymerizing a conjugated 1,3-diene hydrocarbon by contacting it with a lithium catalyst of the group consisting of lithium and a hydrocarbyl lithium and maintaining it in contact with the lithium catalyst in the presence, as the sole diluent, of a total at least 3 parts by weight of a monovinylidene aromatic hydrocarbon/part of the conjugated 1,3-diene hydrocarbon until a rubbery polymer containing not more than about 75% by weight of chemically-combined monovinylidene armoatic hydrocarbon is obtained, deactivating the rubbery polymer, to terminate the activity of the lithium catalyst, adding an organoperoxy catalyst, and heating the resultant rubber in monomer solution to polymerize the monovinylidene aromatic hydrocarbon and grafting at least a portion thereof upon said rubbery polymer.

17. The process of claim 16 wherein the conjugated 1,3-diene hydrocarbon is initially contacted with the lithium catalyst in the presence of all of the monovinylidene aromatic hydrocarbon diluent.

18. The process of claim 16 wherein the conjugated 1,3-diene hydrocarbon is initially contacted with the lithium catalyst in the presence of up to about 0.1 part of the monovinylidene aromatic hydrocarbon diluent/part of conjugated 1,3-diene hydrocarbon, and the remainder of the diluent is gradually added to the reaction mixture during the course of the polymerization.

19. The process of claim 16 wherein the conjugated 1,3-diene hydrocarbon is initially contacted with the lithium catalyst in the absence of the monovinylidene aromatic hydrocarbon diluent, and the diluent is gradually added to the reaction mixture during the course of the polymerization after the stage of about 5% conversion of conjugated 1,3-diene hydrocarbon to polymer.

References Cited by the Examiner

UNITED STATES PATENTS

| | | | |
|---|---|---|---|
| 2,755,270 | 7/1956 | Hayes | 260—880 |
| 3,149,182 | 9/1964 | Porter | 260—880 |

FOREIGN PATENTS

| | | |
|---|---|---|
| 238,542 | 6/1959 | Australia. |
| 767,642 | 2/1957 | Great Britain. |
| 884,974 | 12/1961 | Great Britain. |
| 1,273,982 | 9/1961 | France. |

MURRAY TILLMAN, *Primary Examiner.*

P. LIEBERMAN, *Assistant Examiner.*